UNITED STATES PATENT OFFICE 2,475,886

SULFONATED COPOLYMER OF STYRENE AND MALEIC ANHYDRIDE

Max T. Goebel, Rocky River, Ohio, assignor to E. I. du Pont de Nemours & Company, Wilmington, Del., a corporation of Delaware No Drawing. Application October 27, 1943, Serial No. 507,900

1 Claim. (Cl. 260—79.3)

This invention relates to modifying leather and more particularly to novel sulfonated polymeric compositions having a plurality of carboxyl groups attached to aliphatic carbon, and a plurality of sulfonic groups attached to aromatic carbon, such compositions being useful for modifying leather.

U. S. Patents 2,205,882 and 2,205,883 to Graves describe tanning processes which employ as tanning agents acidic polymeric materials in which the acidity is due to carboxyl groups attached to aliphatic carbon atoms. The present invention is concerned with polymeric materials containing carboxyl groups attached to aliphatic carbon atoms and additionally containing sulfonic groups, and with the employment of such materials for treating already-tanned leather. According to the Graves patents, the tanning agents there described are preferably used in the pH range above about 3.0. At lower pH values Graves' materials tend to lack sufficient solubility to be useful for treating and modifying leather.

Monomeric sulfonated materials have already been used for modifying leather, but the leather products so produced lack color stability when subjected to ultraviolet light. Even the intensity of ultraviolet light found in direct sunlight is often enough to affect deleteriously the color of such leather products.

It is an object of this invention to provide compositions for modifying leather and especially for bleaching chrome-tanned leather. Another object is to provide compositions for producing bleached chrome leather which is resistant to the action of ultraviolet light. Another object is to provide novel, sulfonated polymeric compositions having improved solubilities at low pH range. Another object is to provide novel sulfonated copolymers of styrene and maleic anhydride. Other objects will appear hereinafter.

The foregoing and other objects of this invention are accomplished by novel, sulfonated polymeric compositions having a plurality of carboxyl groups attached to aliphatic carbon and a plurality of sulfonic groups attached to aromatic carbon, which are useful for modifying leather.

Compositions of this invention are completely soluble even at low pH, and when used for bleaching chrome leather give a product, the color of which is stable under untraviolet light.

The compositions of this invention are polymers of the type described in Graves' Patent 2,205,882 which have been sulfonated. Included are sulfonates derived from co-polymers of alpha-unsaturated carboxylic acids and their equivalent anhydrides, such as maleic anhydride, polyacrylic acid, and polymethacrylic acid, with polymerizable olefins containing an aromatic substituent, such as styrene, methyl styrene, and indene. The invention is particularly concerned with sulfonation products of co-polymers of maleic anhydride and styrene.

The compositions have a plurality of carboxyl groups. The carboxyl groups may have the structural formula

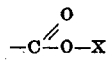

where X is hydrogen or a metal or an ester group. Such carboxyl groups are attached to aliphatic carbon, that is, a carbon atom which is a part of an acyclic or saturated cyclic structure. The compositions also contain a plurality of sulfonic groups which may have the structure,

where X is hydrogen or a metal or an ester group. Such sulfonic groups are attached to aromatic carbon, that is to carbon which is a part of an unsaturated cyclic structure, such as a benzene ring. By plurality is meant that there is more than one of the particular groups in the entire molecule, but not necessarily more than one at any single point of attachment.

The sulfonated polymeric materials may be prepared by methods with which the art is already acquainted in connection with the sulfonation of other types of compounds. For example, they may be made by treatment of a suitable polymeric material with chlorosulfonic acid or concentrated sulfuric acid. A preferred method of sulfonation is described in the example below.

Modification of leather accomplished by processes of this invention may consist of filling, plumbing, or otherwise altering the physical characteristics of the leather, and is especially concerned with the bleaching of leather. The processes are well adapted for the bleaching of chrome-tanned leather to give a very white, light-stable product.

Sulfonated polymeric materials of this invention in which at least a part of the carboxyl groups are esterified are particularly useful as fatliquoring agents for leather. Preferably, there is used for this purpose the half-ester of a sulfonated heteropolymer of styrene and maleic anhydride; that is, the anhydride linkages in the molecule due to the maleic anhydride are opened up to form carboxyl groups, and of each two carboxyl groups so formed one is esterified, as by treating with an alcohol under dehydrating conditions. Irrespective of the polymer employed, the ester groups used should be those of higher molecular weight alcohols, such as lauryl and stearyl alcohols, if the maximum fatliquoring effect is to be obtained.

According to this invention, leather is subjected to contact with a solution of a sulfonated polymeric material, such as above described, preferably in ordinary tanning machinery, and by techniques customarily employed for causing effective contact between the skins or leather and a treating solution.

When the leather-modifying processes comprise bleaching chrome leather, they are carried out in the pH range of about 1.5 to 3.0. Exposure of leather to a very low pH is undesirable, but no difficulty is encountered when the pH is from 1.5 to 3.0 and the acidity is due to or accompanied by the presence of sulfonated polymeric compositions of this invention and the time of contact is not greatly extended beyond that required to bleach chrome leather.

In addition to their action in modifying leather, the novel compositions of this invention may act as foaming agents, acid-emulsifying agents, dye-leveling agents and mordants.

The nature of this invention and its manner of application may be better understood by reference to the following illustrative example.

Example

A sulfonated polymeric material of this invention having a plurality of carboxyl groups attached to aliphatic carbon and a plurality of sulfonic groups attached to aromatic carbon was prepared in the following manner:

A styrene-maleic anhydride co-polymer was prepared as described in the example, page 2, of Condo et al., U. S. Patent 2,286,062, by catalytic polymerization of styrene and maleic anhydride in xylene solution. Seventy-five parts by weight of the solid co-polymer produced before digestion in sodium hydroxide was suspended in 600 parts of ethylene dichloride. To this well-agitated mixture there was added slowly and carefully 33 parts of chlorosulfonic acid and 62.5 parts of ethylene dichloride. No cooling or heating was required; the temperature remained at about 34° C. Agitation was continued for one-half hour after addition of the chlorosulfonic acid was complete. No gumming up or other agitation difficulty was encountered. The product was then removed by filtration and was air-dried to yield 125 parts by weight of a light tan granular solid. A solution of this sulfonated co-polymer was made by dissolving 16 parts by weight of the solid in 84 parts of hot water and adding sufficient 50% sodium hydroxide solution to give a pH of 2.9 in the solution.

The solution obtained as above described was used for bleaching chrome-tanned calfskin by immersing 50 parts by weight of the chromed calfskin in a mixture of 6 parts of the concentrated solution diluted with 75 parts of water and agitating for ½-hour. The chromed calfskin was then removed, washed, and dried according to customary practices. The leather obtained was observed to be full, plump, and had a pleasing light color. As compared to the untreated chromed calfskin, the color was much lighter. It was further found that the color of the treated leather did not change appreciably even after prolonged exposure to ultraviolet light.

While in the foregoing description of this invention, there have been shown certain specific sulfonated polymeric compositions and certain specific processes for treating leather therewith, it will be understood that without departing from the spirit of this invention, one skilled in the art may produce various sulfonated polymeric compositions and employ various processes for treating leather.

Processes for treating leather with the compositions of the present application are the subject of a United States patent application Serial No. 546,579, filed July 25, 1944, by Joseph S. Kirk, now U. S. Patent 2,452,536.

I claim:

A composition comprising a sulfonated co-polymer of styrene and maleic anhydride in which a plurality of sulfonic groups are attached to aromatic carbon atoms of the styrene.

MAX T. GOEBEL.

REFERENCES CITED

The following references are of record in the file of this patent:

UNITED STATES PATENTS

| Number | Name | Date |
|---|---|---|
| 1,988,905 | Kroch | Jan. 22, 1935 |
| 2,031,929 | Breuers et al. | Feb. 25, 1936 |
| 2,047,398 | Voss | July 14, 1936 |